United States Patent
Morel et al.

(10) Patent No.: US 10,250,127 B2
(45) Date of Patent: Apr. 2, 2019

(54) AC TO DC POWER CONVERTER AND ASSOCIATED ELECTRICAL GRID

(71) Applicant: THALES, Courbevoie (FR)

(72) Inventors: Benoit Morel, Brest (FR); David Le Bars, Brest (FR); Hervé Stephan, Brest (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/563,919

(22) PCT Filed: May 24, 2016

(86) PCT No.: PCT/EP2016/061696
§ 371 (c)(1),
(2) Date: Oct. 2, 2017

(87) PCT Pub. No.: WO2016/189001
PCT Pub. Date: Dec. 1, 2016

(65) Prior Publication Data
US 2018/0131270 A1    May 10, 2018

(30) Foreign Application Priority Data
May 27, 2015 (FR) ..................... 15 01093

(51) Int. Cl.
*H02M 1/32* (2007.01)
*H02M 1/42* (2007.01)
(Continued)

(52) U.S. Cl.
CPC .......... *H02M 1/4258* (2013.01); *H02M 1/32* (2013.01); *H02J 1/00* (2013.01); *H02M 2001/0025* (2013.01); *Y02B 70/126* (2013.01)

(58) Field of Classification Search
None
See application file for complete search history.

(56) References Cited

U.S. PATENT DOCUMENTS 5,731,665 A * 3/1998 Pruett ................. H05B 41/392
                                                               315/224
5,969,962 A    10/1999 Gabor
(Continued)

OTHER PUBLICATIONS

D. Salomonsson et al., "Low-Voltage DC Distribution System for Commercial Power Systems with Sensitive Electronic Loads," IEEE Transactions on Power Delivery, vol. 10, No. 3, Jul. 1, 2007, pp. 1620-1627, XP011186623.
(Continued)

*Primary Examiner* — Jeffrey A Gblende
(74) *Attorney, Agent, or Firm* — Baker & Hostetler LLP

(57) ABSTRACT

A power converter comprises a power structure receiving, as input, an AC voltage comprising at least one phase and delivering, as output, a DC voltage, the output power of the power structure being regulated by a multiplier receiving, as input, a current control signal and a signal proportional to the output voltage of the power structure, the current control signal being generated by a current correction module receiving, as input, a signal proportional to the difference between the output current of the power structure and a current setpoint signal. Electrical network comprising such a power conversion circuit is also provided.

5 Claims, 6 Drawing Sheets

(51) Int. Cl.
*H02M 1/00* (2006.01)
*H02J 1/00* (2006.01)

(56) References Cited

U.S. PATENT DOCUMENTS

| | | | | |
|---|---|---|---|---|
| 6,326,771 | B1* | 12/2001 | Popescu-Stanesti | ............... H02J 7/0068 320/139 |
| 2003/0160576 | A1* | 8/2003 | Suzuki | ............... H05B 41/2882 315/291 |
| 2010/0001659 | A1* | 1/2010 | Inoue | ............... H05B 33/0815 315/291 |
| 2015/0028935 | A1* | 1/2015 | Pantano | ............... H02H 1/0092 327/419 |

OTHER PUBLICATIONS

Hiroaki Kakigano et al., "Low-Voltage Bipolar-Type DC Microgrid for Super High Quality Distribution," IEEE Transactions on Power Electronics, Institute of Electrical and Electronics Engineers, vol. 25, No. 12, Dec. 1, 2010, pp. 3066-3075, XP011343841.
D. Salomonsson et al., "Protection of Low-Voltage DC Microgrids," IEEE Transactions on Power Delivery, vol. 24, No. 3, Jul. 1, 2009, pp. 1045-1053, XP011268511.
P. Cairoli et al., "Controlled power sequencing for fault protection in DC nanogrids," 2011 IEEE International Conference on Clean Electrical Power, Jun. 14, 2011, pp. 730-737, XP032056668.

* cited by examiner

AC TO DC POWER CONVERTER AND ASSOCIATED ELECTRICAL GRID

CROSS-REFERENCE TO RELATED APPLICATIONS

This application is a National Stage of International patent application PCT/EP2016/061696, filed on May 24, 2016, which claims priority to foreign French patent application No. FR 1501093, filed on May 27, 2015, the disclosures of which are incorporated by reference in their entirety.

FIELD OF THE INVENTION

The present invention relates to the field of power electronics and in particular to that of electrical systems connected to power distribution networks. The present invention more particularly relates to a power converter and an associated electrical network.

BACKGROUND

The invention can be applied to electrical distribution networks such as for example those on board transport means, in particular in the aeronautical, automotive or rail fields. These networks make it possible to supply power from an AC voltage source comprising at least one phase to various devices requiring DC voltages.

In the electrical networks, the power supply must address multiple sub-assemblies or consumers connected to said network. A problem arises when one or more of these sub-assemblies is short-circuited. Specifically, unlike power supplies serving only one electrical device, cutting the power supply in order to disconnect it from the network, for example by tripping a protective device or melting a fuse, risks cutting the supply of power to the other consumers connected to the electrical network. If a consumer becomes faulty, the power supply must not be interrupted and must be capable of activating a safety measure configured to isolate the faulty consumer from the network.

One problem with power converters implemented using power factor correction to regulate their output current is due to the behavior of this power structure when its output is short-circuited or when the amplitude of the output voltage is very low. Specifically, the transfer function of such a structure comprises a static gain that is proportional to the inverse of the output voltage of the power structure.

With reference to FIG. 1, it is recalled that when an AC-to-DC power conversion circuit of power factor corrector (PFC) type is connected to an AC network, it does not disrupt, or hardly disrupts, the latter. To achieve this, the PFC circuit must have a power factor that is as close as possible to unity and have very little in the way of input current harmonics. Its input current must be sinusoidal and in phase with the voltage at its input. Viewed from its input, the converter must be as close as possible to a resistive load. To this end, the power structure comprises a primary current loop. The input current of the power structure is slaved to a setpoint signal that is proportional to the input voltage of said power structure and therefore takes the sinusoidal form thereof. Controlling the amplitude of this setpoint signal allows the amplitude of the current absorbed by the power structure to be controlled. In order to maintain a gain that is independent of the input voltage between the control signal B and the power absorbed by the power structure, the input current setpoint signal, consigne_Iin, is usually determined as follows:

$$\text{consigne\_Iin} = A \times B / C^2$$

Where: A is a signal proportional to the instantaneous input voltage, it therefore has the sinusoidal form thereof;
B is a control signal allowing the power absorbed by the power structure to be controlled;
C is a signal proportional to the RMS value of the input voltage of the power structure.

By way of illustration, FIG. 2 shows an exemplary embodiment of a power structure of flyback type known from the prior art. Let $U_{in}(t)$ be the input voltage. This voltage may be written in the form:

$$U_{in}(t) = U_{eff} \times \sqrt{2} \times \sin(\omega \times t)$$

where $U_{eff}$ represents the RMS value of the input voltage.
Following the preceding descriptions, it is possible to write:

$$A = K_1 \times U_{eff} \times \sqrt{2} \times \sin(\omega \times t)$$

$$C = K_2 \times U_{eff}$$

Where $K_1$ and $K_2$ are two constants
If it is assumed that the PFC is operating correctly, the input current I follows its setpoint and hence:

$$I = \text{consigne\_Iin} = K_1 \times U_{eff} \times \sqrt{2} \times \sin(\omega \times t) \times B / K_2^2 \times U^2_{eff}$$

The RMS value of the input current can therefore be extracted:

$$I_{eff} = K_1 \times B / (K_2^2 \times U_{eff})$$

Since the current and the voltage are in phase, the input power $P_{in}$ may be written as:

$$P_{in} = I_{eff} \times U_{eff} = (K_1 / K_2^2) \times B$$

It is observed that the input power, and hence the delivered power (efficiency apart), varies only with the term B. Since the constants $K_1$ and $K_2$ are defined by the measurement circuit and hence set in the design phase, the power structure, including the primary current feedback control loop, therefore delivers an output power that is proportional to B.

In order to precisely control the output current, it is feedback-controlled. FIG. 3 schematically shows an exemplary secondary current loop. In nominal operation, the output current setpoint is defined by the corrector feedback-controlling the output voltage. In the event of short-circuit operation, a fixed value corresponding to the desired short-circuit current is applied.

Since the corrector feedback-controlling the output current directly controls the "B" input of the power structure including the primary current loop, this results in the output power being controlled. The relationship between output power and output current produces a gain that is proportional to the inverse of the output voltage (1/Vs) in the secondary current loop. For a given output voltage Vs, the sizing of the corrector of the output current loop does not present any problems. However, the stability criteria of the loops (gain and phase margins) cannot be guaranteed as the voltage drops. Since the gain of the open-loop transfer function (FBTO) increases while the phase remains unchanged, the drop in the output voltage Vs leads to an increase in the passband and a decrease in the phase margin, until the system becomes unstable.

By way of example, FIGS. 4 to 6 show Bode plots (magnitude and phase) of the open-loop transfer function of one and the same power structure for a case of a nominal voltage of 42 V, in the case of the voltage having fallen to 20 V and in the case of the voltage having fallen to 7 V. In the case of the output voltage being at its nominal value, the structure has a passband of 220 Hz, a gain margin of 15.5 dB and a phase margin of 42°. When the output voltage drops to 20 V, the passband increases to the detriment of the stability margins. The passband goes to 340 Hz while the gain margin and the phase margin fall to 9 dB and 22°, respectively. In the latter example, instability is reached, the phase and gain margins are zero.

One problem therefore arises when the output of the power structure is short-circuited or when the amplitude of the output voltage is very low. In this case the current loop becomes unstable and instability of the output current loop results in a large oscillation of the output current, hence a loss of control of said output current. This may result in the converter overheating, or even being destroyed.

Power converters in which stability is ensured by the circuit at the primary of the power structure are known, but these present the problem of controlling the output current from the primary circuit to the secondary of the power structure.

SUMMARY OF THE INVENTION

One aim of the invention is in particular to remedy all or some of the drawbacks of the prior art by providing a solution allowing a DC voltage bus supply circuit, when one of its consumers is faulty, to be capable of delivering a DC short-circuit current that is sufficiently high to activate the safety measures of this user and to isolate it from the power supply network without disconnecting said supply circuit or destroying it.

To this end, one subject of the invention is a power converter and a power supply network such as described by the claims.

BRIEF DESCRIPTION OF THE DRAWINGS

Other particularities and advantages of the present invention will become more clearly apparent upon reading the description which follows, provided by way of non-limiting illustration and with reference to the appended drawings, in which.

DETAILED DESCRIPTION

Throughout the rest of the description, the term "consumer" will refer to any item of equipment, circuit, sub-circuit, and in general to any item of equipment connected to the supply bus.

Likewise, the terms "DC distribution network" and "DC bus" will be used interchangeably.

The invention relates to a power converter converting an AC input voltage to a DC output voltage. As seen above, controlling the power delivered by the power structure rather than directly controlling its output current introduces a term that is proportional to the inverse of the output voltage to the transfer function of the power converter. The principle of the invention is based on the use of a multiplication circuit in order to compensate for the term proportional to the inverse of the output voltage and to obtain a conversion circuit having a gain that is independent of the output voltage.

Figure 1:
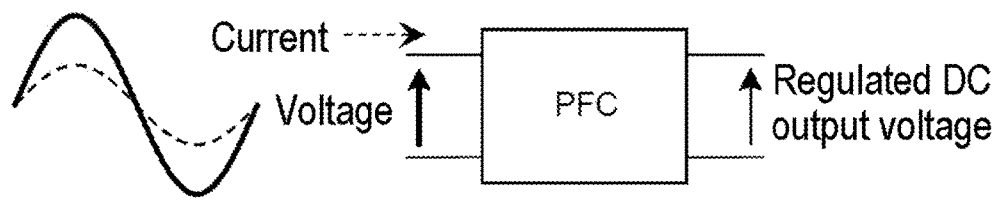
FIG. 1, mentioned above, illustrates the principle of power factor correction.
Figure 2:
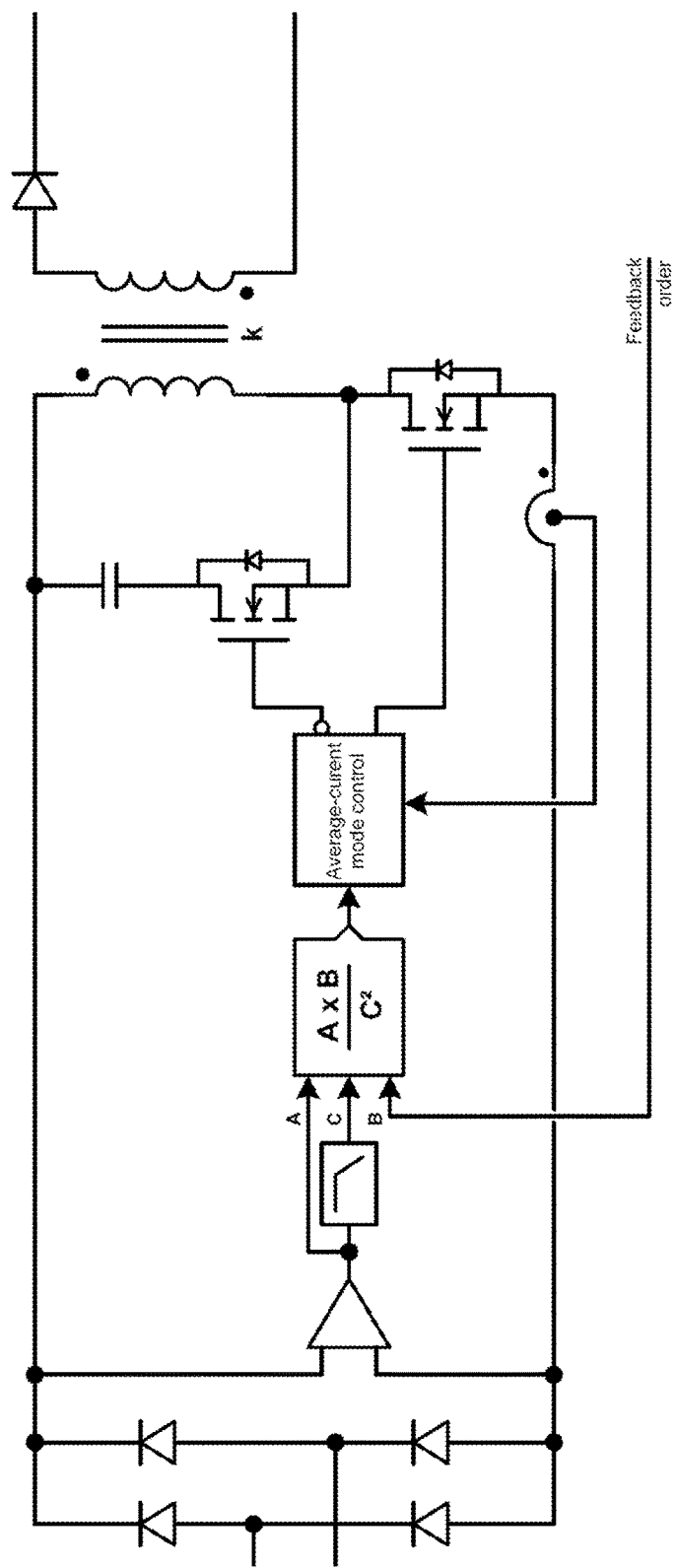
FIG. 2, mentioned above, shows an exemplary embodiment of a power structure of flyback type known from the prior art.
Figure 3:
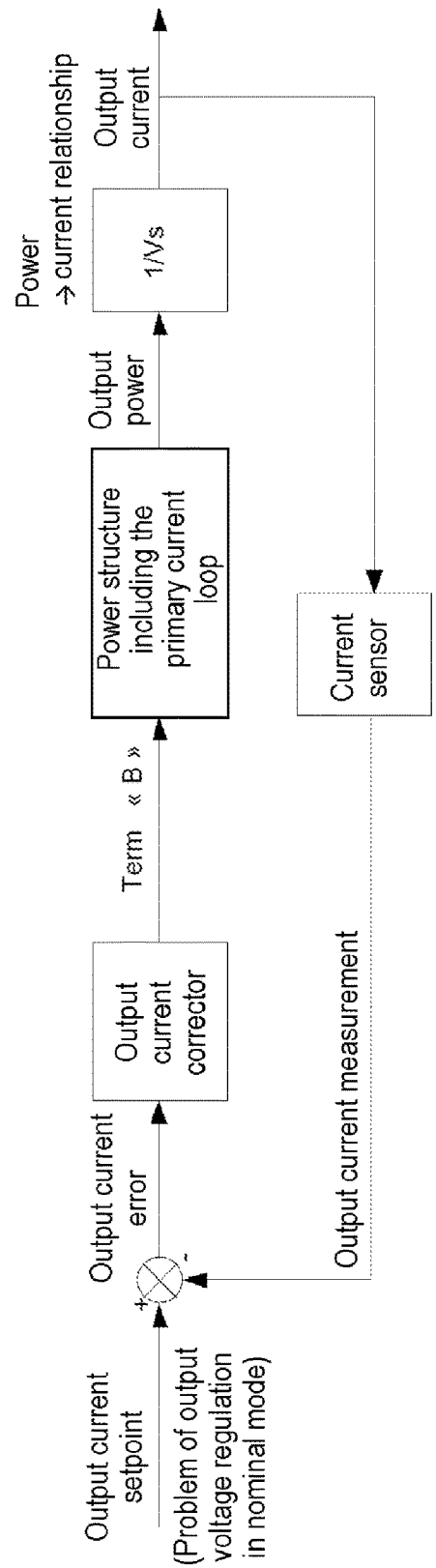
FIG. 3, mentioned above, schematically shows an exemplary secondary current loop known from the prior art.
Figure 4:
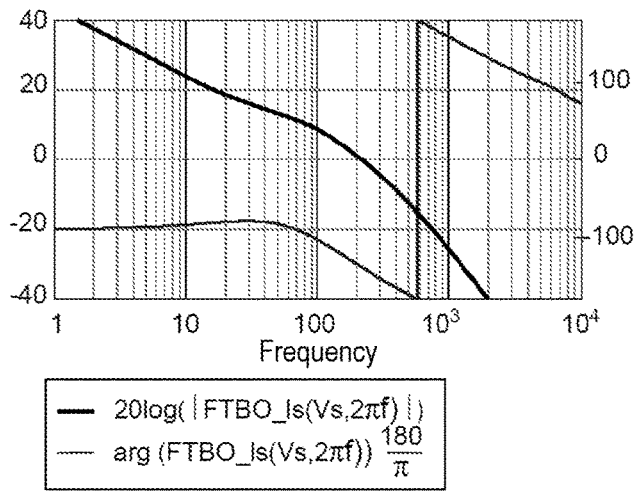
FIGS. 4 to 6, mentioned above, show Bode plots of one and the same power structure in the case of a nominal voltage of 42 V and in the case of the voltage having dropped to 20 V and to 7 V.
Figure 5:
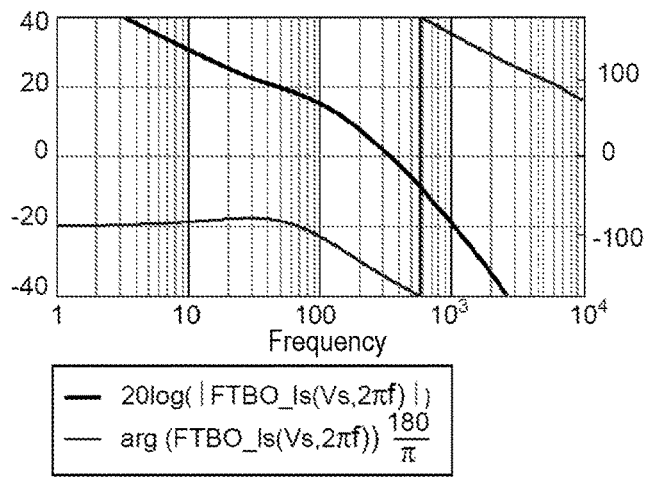
Figure 6:
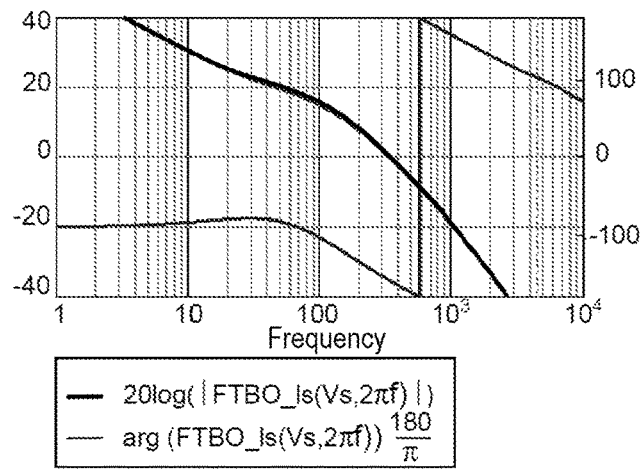
Figure 7:
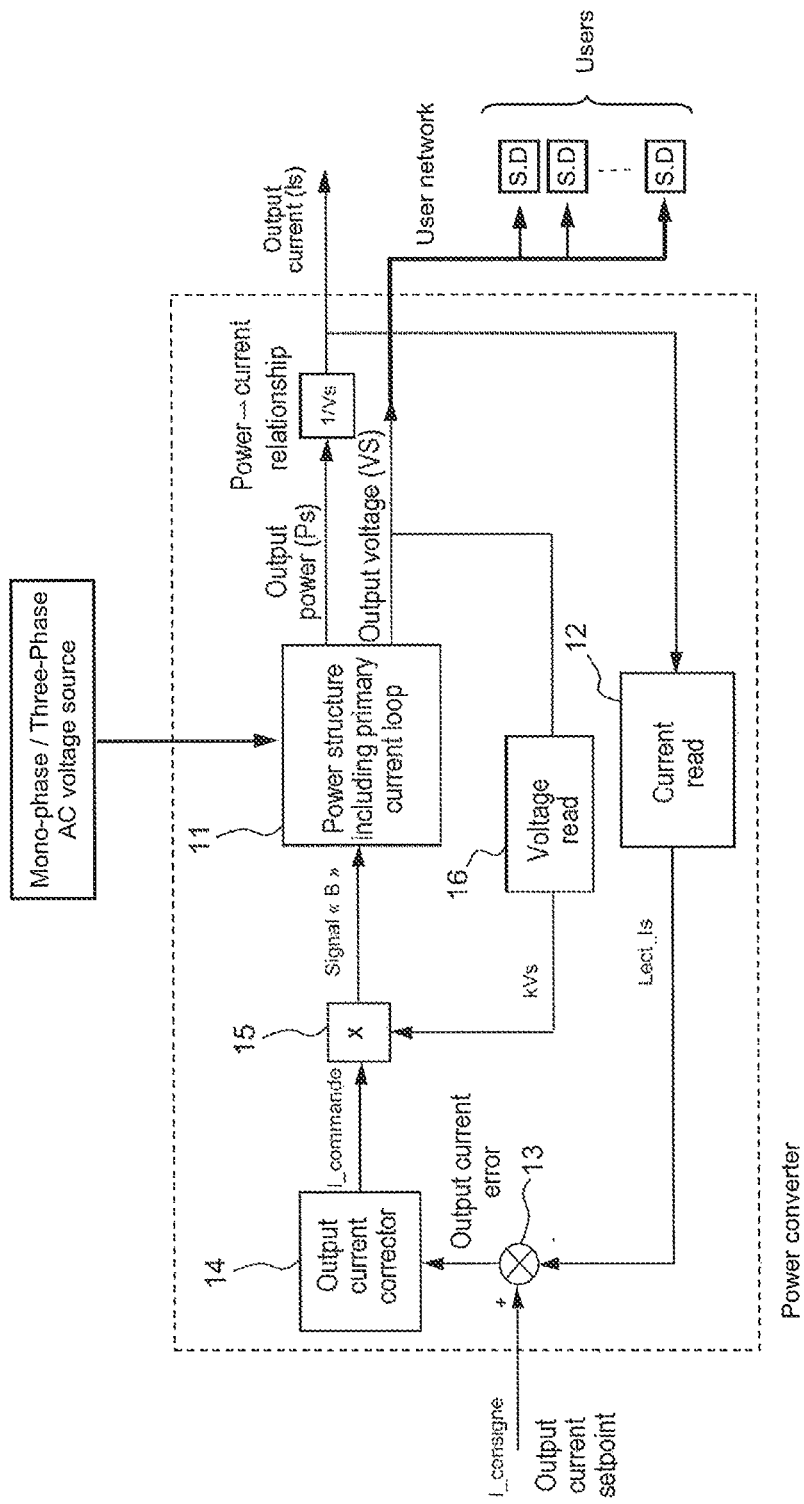
FIG. 7 schematically shows an exemplary embodiment of a power converter according to the invention.

With reference to FIG. 7, the power converter according to the invention is formed around a power structure 11 of PFC, or power factor corrector, type, regulating its output current. This power structure 11 receives, as input, an AC voltage and delivers, as output, a DC voltage Vs. The input voltage may be single phase or polyphase, such as for example a three-phase AC voltage. The power structure 11 may, for example, be a structure of flyback type.

In order to control the output current Is, the power converter comprises a secondary current loop configured to feedback-control the output current of the latter. The power converter comprises a current read module 12, an adder 13 and a current correction module 14.

The current read module 12 receives, as input, the output current of the power structure 11 and its output is connected to the input of the adder 13. The purpose of this module 12 is to measure the output current of the power structure 11. To this end, the current read module 12 may comprise a current sensor configured to deliver a signal Iect_Is representative of the amplitude of the output current Is of the power structure 11. This module 12 may also comprise a current filter. The current sensor may, for example, be a sensor of inductive type, a voltage sensor configured to deliver a signal representative of the amplitude of the voltage across the terminals of a low-value resistor connected in series or any other current sensor known to a person skilled in the art.

The adder 13 receives, on its inverting input, the signal Iect_Is and, on the other input, an output current setpoint signal I_consigne. This current setpoint signal allows the level of the output current of the power structure 11 to be fixed.

The output signal is defined by a corrector of a loop for regulating the output voltage (not shown) of the power converter. In the secondary output voltage loop, the amplitude of the output voltage of the converter is measured and is compared with a predetermined voltage reference value. The error obtained is then processed to give the value of the output current setpoint. In the event of a short-circuit, the output current setpoint takes a predetermined fixed value corresponding to a threshold value of the output current. Advantageously, this allows the amplitude of the short-circuit current to be defined and controlled and it guarantees that the amplitude of the current will never be higher than a predefined value so as not to damage the consumers connected to the network or so as not to damage the power converter. In nominal mode, the current setpoint signal regulates the output current. This is a signal inside the voltage loop.

The adder 13 or comparator is configured to deliver, as output, an output current error signal that is proportional to the difference between the output current setpoint I_consigne and the output signal of the current read module Iect_Is.

According to one preferred embodiment, the adder 13 is an analog circuit such as, for example, a unity gain differential amplifier or any other analog circuit known to a person skilled in the art.

The output current correction module 14 is connected in series between the output of the adder 13 and a first input of a multiplier 15 that is connected to the input of the power structure 11. Preferably, the multiplier 15 is an analog multiplier circuit.

The output current correction module 14 is configured to deliver, as output, a control signal I_commande. The purpose of this module 14 is to fix the current absorbed by the power structure 11 so that it is sufficient for the output voltage Vs of the power structure to have the required amplitude. According to one preferred embodiment, the current correction module 14 is implemented as an analog circuit. The correction module 14 may be an analog filter based on an operational amplifier, on resistors, on capacitors and potentially on inductors.

The power converter comprises a voltage read module 16 connected to the output of the power structure 11. It is configured to measure the output voltage Vs of the power structure and to deliver, as output, a voltage kVs, the amplitude of which is proportional to the output voltage Vs. The voltage read module 16 is connected in series between the output of the power structure 11 and a second input of the multiplier 15. According to one preferred embodiment, the voltage read module 16 is an analog module formed entirely from analog components. This module 16 may comprise a voltage sensor made, for example, from a voltage amplifier having high input impedance.

The output signal of the multiplier 15 corresponds to the control signal, previously referred to as "B", allowing the power absorbed by the power structure 11 to be controlled. The output of the multiplier 15 is connected to the "B" control input of the power structure.

As seen above, in the power converter, the output current is therefore not directly controlled, rather the output power is controlled via the signal "B"; because of this, a gain "1/Vs" that is proportional to the inverse of the output voltage is present in the secondary current loop. This gain arises from the relationship linking the power to the current: Ps=Vs×Is.

Advantageously, the addition of the multiplier 15 and of the voltage read module 16 to the secondary current loop makes it possible to multiply the transfer function of the circuit by the term kVs, where k is a non-zero real number, and therefore makes it possible to remove the dependency of the transfer function on the term in 1/Vs. Multiplying the transfer function by the output voltage Vs thus makes it possible to stabilize the conversion circuit in the event of a fault or of a short-circuit in a consumer, that is to say when the amplitude of the output voltage is zero or close to zero. The presence of the multiplier 15 and of the voltage read module 16 allows the power converter to remain stable in the event of a short-circuit and hence to deliver a short-circuit current over the network that is capable of activating the safety measures of a faulty consumer in order to isolate it from said network instead of delivering a current having excessive and uncontrolled amplitude that could damage the conversion circuit or consumers.

Equations (1) and (2) give the expression for the open-loop transfer functions in the case of the voltage loop being absent (FTBO_1) and in the case of the voltage loop being present (FTBO_2).

$$FTBO\_1 = G_{corr\_Is}(\omega) \times G_{st\_puiss}(\omega) \times (1/Vs) \times G_{Iect\_Is}(\omega) \quad (1)$$

$$FTBO\_2 = G_{corr\_Is}(\omega) \times G_{st\_puiss}(\omega) \times (1/Vs) \times G_{Iect\_Is}(\omega) \times \quad (2)$$
$$G_{Iect\_Vs}(\omega) \times kVs$$
$$= G_{corr\_Is}(\omega) \times G_{st\_puiss}(\omega) \times G_{Iect\_Is}(\omega) \times G_{Iect\_Vs}(\omega) \times k$$

Where: $G_{corr\_Is}(\omega)$ represents the complex gain of the current correction module;

$G_{st\_puiss}(\omega)$ represents the complex gain of the power structure;

$G_{Iect\_Is}(\omega)$ represents the complex gain of the current read module;

$G_{Iect\_Vs}(\omega)$ represents the complex gain of the voltage read module;

Vs represents the output voltage of the converter and k a non-zero real number.

The multiplier 15 multiplies the output of the corrector 14 of the secondary current loop by a quantity kVs that is proportional to the output voltage and introduces a term "×Vs" to the open-loop transfer function of the secondary current loop. Thus, the term "1/Vs", which is a source of instability when the output voltage is low, is canceled out by the term "×Vs" inserted, by means of the multiplier, into the open-loop transfer function, which becomes independent of the output voltage Vs.

Figure 8:
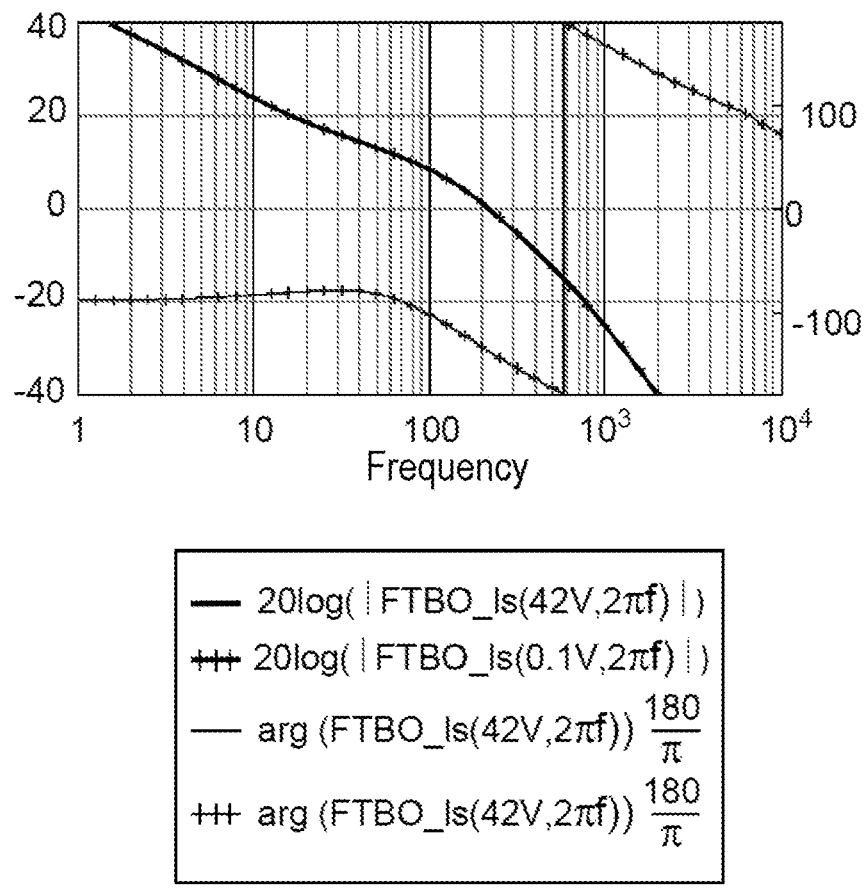
FIG. 8 shows the Bode plot of an exemplary power converter according to the invention in the case of a nominal voltage and of an output short-circuit.

FIG. 8 shows the Bode plot (magnitude and phase) of an exemplary power converter according to the invention in the case of a nominal voltage of 42 V and of an output voltage that is close to short circuit (0.1 V). The curves representative of the gain and of the phase remain identical for 42 V or 0.1 V output voltage. The sizing of the corrector 14 of the secondary current loop and the performance of this loop (stability, speed) remain valid for any output voltage value, including in the event of a short circuit.

The addition of a multiplier term Vs in order to compensate for the term in 1/Vs, where Vs represents the output voltage of the conversion circuit, makes it possible to regulate the output power Ps of the converter instead of regulating its output current and introduces no change in terms of balancing. The addition of the multiplier 15 and of the voltage read module 16 thus makes it possible to convert the output of the corrector of the secondary current loop, which is a quantity corresponding to a current, to a quantity corresponding to a power (the result of multiplication by the output voltage Vs). This ensures coherence with the "B" input of the power structure with its primary regulation loop, which controls the absorbed power.

If a consumer has a short circuit, the voltage of the network will suddenly drop and all of the consumers will be subject to a dip in voltage. The power converter will deliver a short-circuit current of sufficiently high amplitude to activate the safety measures of the faulty consumer and the network will return to full performance with absolute stability. Advantageously, the presence of the multiplier 16 makes it possible to return to the nominal output voltage Vs linearly and without oscillations or steps.

The invention can be applied to DC electrical distribution networks or DC supply buses. These networks may, for example, be installed on board land, air or sea transport means. These distribution networks or buses are intended to supply power to multiple consumers that are connected to said network.

This electrical network or bus may comprise at least one AC voltage source comprising at least one phase connected to the input of a power conversion circuit such as described above, the DC voltage supplying said electrical distribution network being found at the output terminals of said power conversion circuit. The AC voltage may be a single-phase voltage or a polyphase voltage such as, for example, a three-phase voltage. The electrical distribution network is configured to supply power to a plurality of consumers, each consumer comprising a safety device configured to isolate the consumer from the network in the event that a current of high amplitude or a short-circuit current is detected. This safety device may be, for example, a fuse, a circuit breaker or any other equivalent isolation device.

Preferably, the various modules described above, such as the current read module 12, the adder 13, the current correction module 14, the multiplier 15 and the voltage read module 16, are implemented solely using analog components. This embodiment it is in no way limiting and all or some of one or more modules may be implemented using digital circuits, for example in the case of use in an electrical network intended for a field other than avionics.

The invention claimed is:

1. A power converter of power factor corrector type, comprising a power structure receiving, on a first input, an AC voltage comprising at least one phase and delivering, on a first output, a DC voltage,
   an output power of said power structure being regulated by a multiplier receiving, as a first input, a current control signal and a signal proportional to an output voltage of the power structure,
   wherein said current control signal is generated by a current correction module receiving, as a second input, a signal proportional to a difference between an output current delivered on a second output of the power structure and an output current setpoint signal, and wherein the current correction module generating a predetermined fixed value in an event of an output short circuit operation.

2. The power converter as claimed in claim 1, comprising:
   a current read module connected in series between the first output of the power structure and an adder, said adder receiving, on a second input, a predetermined output current setpoint signal, said current read module being configured to deliver, as output, an output signal representative of an amplitude of an output current of the power structure and said adder being configured to deliver, on an output, an output signal proportional to a difference between the output current setpoint signal and the output signal of the current read module;
   a current correction module connected in series between the output of the adder and a first input of a multiplier, an output of said multiplier being connected to an input of the power structure; and
   a voltage read module connected in series between the second output of the power structure and a second input of the multiplier, said voltage read module being configured to measure the first output DC voltage of the power structure and to deliver said DC voltage on the second input of the multiplier.

3. The power converter as claimed in claim 1, comprising a power conversion circuit that is an analog circuit.

4. The power converter as claimed in claim 1, wherein the power structure is capable of receiving, a three-phase voltage on the first input.

5. An electrical network comprising a power converter as claimed in claim 1 and at least one AC voltage source, said power converter being connected by the first input to said AC voltage source and delivering, on the first output, a DC voltage supplying said electrical network, a plurality of consumers being connected to said electrical network, each consumer comprising a safety device configured to isolate each consumer from the electrical network.

* * * * *